United States Patent [19]

Harney

[11] Patent Number: 4,869,945

[45] Date of Patent: Sep. 26, 1989

[54] WEATHERSTRIP CARRIER

[75] Inventor: Thomas H. Harney, Dayton, Ohio

[73] Assignee: General Motors Corporation, Detroit, Mich.

[21] Appl. No.: 192,019

[22] Filed: May 9, 1988

[51] Int. Cl.[4] ............................................. E06B 7/16
[52] U.S. Cl. ..................................... 428/122; 49/490; 49/498; 52/716; 428/358
[58] Field of Search .................. 428/122, 358; 49/490, 49/498; 52/716

[56] References Cited

U.S. PATENT DOCUMENTS

| | | | |
|---|---|---|---|
| 2,290,842 | 7/1942 | Bush | 428/122 X |
| 3,222,769 | 12/1965 | Le Plae | 428/122 X |
| 3,256,577 | 6/1966 | Bright | 428/122 X |
| 3,310,928 | 3/1967 | Weimar | 428/122 X |
| 4,042,741 | 8/1977 | Bright | 428/358 X |
| 4,105,814 | 8/1978 | Eggert | 428/122 |
| 4,107,898 | 8/1978 | Andrzejewski | 52/716 |
| 4,348,443 | 9/1982 | Hein | 428/358 X |
| 4,399,644 | 8/1983 | Bright | 428/122 X |
| 4,411,941 | 10/1983 | Azzola | 428/122 |
| 4,447,065 | 5/1984 | Dupuy | 49/491 X |
| 4,690,412 | 9/1987 | Tuckley et al. | 428/122 X |
| 4,695,499 | 9/1987 | Whitener | 428/358 X |

FOREIGN PATENT DOCUMENTS

| | | | |
|---|---|---|---|
| 2572694 | 5/1986 | France | 428/122 |
| 2006309 | 5/1979 | United Kingdom | 428/122 |

Primary Examiner—Henry F. Epstein
Attorney, Agent, or Firm—Charles E. Leahy

[57] ABSTRACT

According to the invention, a wedging leg extends inwardly from one of the walls of a channel-shaped weatherstrip carrier and reaches angularly toward the base of the weatherstrip carrier. The wedging leg has a foot including a toe portion which frictionally engages with the flange so that the attempted removal of the carrier from the flange is resisted by the frictional engagement of the toe portion with the flange and the wedging leg is placed in a condition of axial compression tending to bow the wedging leg. The wedging leg has a relatively weakened knee joint generally at the mid-length thereof which defines and controls the bowing of the wedging leg as the carrier is removed from the flange. The foot of the wedging leg also has a heel portion which is carried into progressive frictional engagement with the flange during the progressive removal of the carrier from the flange to thereby increase the area of frictional contact between the flange and the foot so that the wedging leg progressively resist the removal of the carrier from the flange. The carrier also has a reaction arm which extends inwardly from the wall generally adjacent the knee joint of the wedging leg so that the reaction arm is engaged by the knee of the wedging leg upon bowing of the wedging leg thereby supporting the wedging leg at a point closer to the foot to minimize the bowing and thereby maintain the wedging leg in generally columnar axial compression and maintain the foot in substantial frictional engagement to resist removal of the carrier from the flange.

2 Claims, 2 Drawing Sheets

WEATHERSTRIP CARRIER

The invention relates to a weatherstrip carrier for a vehicle body and more particularly provides improved retention of the weatherstrip carrier on a vehicle body flange.

BACKGROUND OF THE INVENTION

It is well known in motor vehicles to provide a weatherstrip for sealing around vehicle body openings such as window openings, door openings and luggage compartment openings. The vehicle body panels defining such openings are provided with a sheet metal flange for mounting the weatherstrip carrier.

The weatherstrip typically comprises a channel-shaped weatherstrip carrier which fits on the flange and which carries a bulbous soft collapsible strip which is engaged by the door, the window or the luggage compartment lid to seal the body opening against intrusion of moisture.

Weatherstrip carriers are conventionally a channel-shaped member comprised of a U-shaped metallic insert which is encapsulated in a suitable elastomeric covering extruded onto the metallic insert. Accordingly, the carrier has spaced apart walls which are connected by a base. The carrier also has integral elastomeric legs which extend inwardly from the walls into the space between the walls. When the carrier is installed over the flange these legs are flexed and frictionally grip with the flange to retain the carrier on the flange. Upon attempted removal of the carrier from the flange the frictional engagement of the legs with the flange cause the legs to resist the removal of the carrier from the flange.

Accordingly, in the prior art conventional weatherstrip carriers, the level of effort required to remove the weatherstrip from the flange is determined to a large extent by the frictional engagement therebetween. This frictional engagement is necessarily dependent on the variables such as humidity, temperature, lubricant or dirt deposits on the flange or carrier, variations in the compounding of the elastomeric material, and other factors.

SUMMARY OF THE INVENTION

The present invention relates to a weatherstrip carrier having a wedging leg acting between one of the walls of the carrier and the flange to substantially increase the force required to remove the weatherstrip carrier from the flange.

According to the invention, a wedging leg extends inwardly from one of the walls of a channel-shaped weatherstrip carrier and reaches angularly toward the base of the weatherstrip carrier. The wedging leg has a foot including a toe portion which frictionally engages with the flange so that the attempted removal of the carrier from the flange is resisted by the frictional engagement of the toe portion with the flange and the wedging leg is placed in a condition of axial compression tending to bow the wedging leg. The wedging leg has a relatively weakened knee joint generally at the mid-length thereof which defines and controls the bowing of the wedging leg as the carrier is removed from the flange. The foot of the wedging leg also has a heel portion which is carried into progressive frictional engagement with the flange during the progressive removal of the carrier from the flange to thereby increase the area of frictional contact between the flange and the foot so that the wedging leg progressively resist the removal of the carrier from the flange. The carrier also has a reaction arm which extends inwardly from the wall generally adjacent the knee joint of the wedging leg so that the reaction arm is engaged by the knee of the wedging leg upon bowing of the wedging leg thereby supporting the wedging leg at a point closer to the foot to minimize the bowing and thereby maintain the wedging leg in generally columnar axial compression and maintain the foot in substantial frictional engagement to resist removal of the carrier from the flange.

Accordingly, one object, feature and advantage of the invention resides in the provision of a wedging leg frictionally contacting the flange and having a knee joint controlling bowing of the leg and a reaction arm engaged by the knee joint to substantially support the wedging leg and resist removal of the carrier from the flange.

Another feature, object and advantage of the invention resides in the provision of a wedging leg integral with a weatherstrip carrier and having a foot engaging the body flange with a toe portion frictionally engaging the body flange to shift the foot upon initial removal of the carrier from the flange so that a heel portion is also engaged with the flange to provide a substantial area of frictional contact between the wedging leg and flange during progressive removal.

BRIEF DESCRIPTION OF THE DRAWINGS

These and other objects, features and advantages of the invention will become apparent upon consideration of the specification and claims and the appended drawings in which

DESCRIPTION OF THE PREFERRED EMBODIMENT

Figure 1:
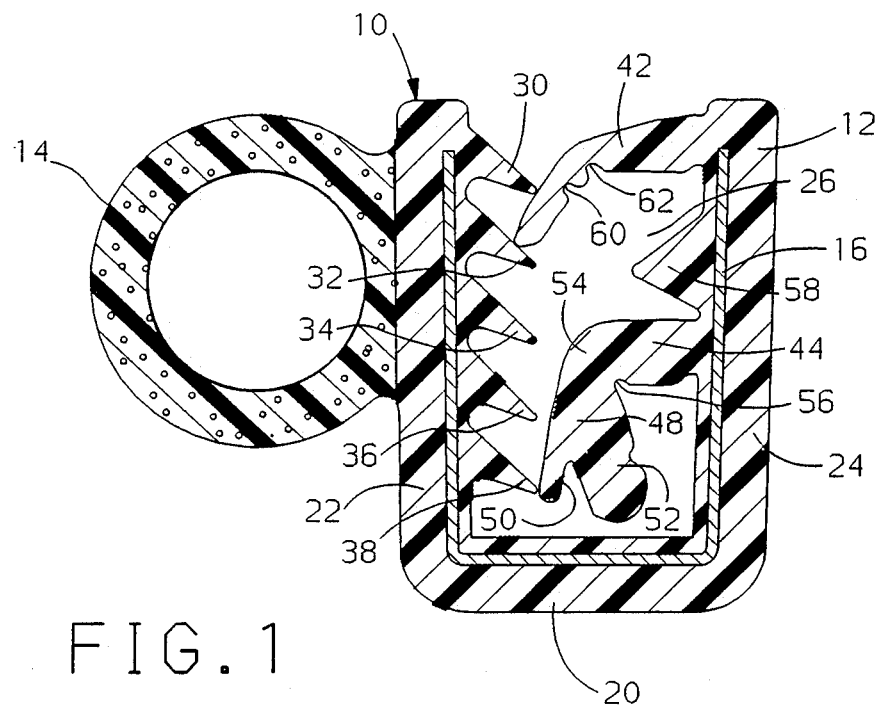
FIG. 1 is a section taken through the weatherstrip and shown prior to installation on a vehicle body flange.

Referring to FIG. 1, it is seen that a weatherstrip generally indicated at 10 includes a weatherstrip carrier 12 of generally channel-shape and carrying a bulbous weatherstrip 14. The carrier 12 includes a U-shaped reinforcement 16, preferably of expanded metal, which is encapsulated in an extruded body of flexible elastomeric material such as 70 Shore A vinyl. The bulbous seal 14 is preferably extruded sponge rubber which is then adhesively married to the carrier 12. The seal 14 is a softer material to provide a compressive water tight sealing engagement with an adjacent closure panel, not shown. Suitably expanded metal carriers are shown in prior patents such as *Weimar* 3,310.928: *Bush* 2.290.842: *Bright* 3,256,577 and *LePlae* 3,222,769.

The weatherstrip carrier 12 includes a base 20 and spaced apart walls 22 and 24 which cooperate to define a central opening 26 adapted to receive a sheet metal flange 28 of a vehicle body panel.

Wall 22 of the weatherstrip carrier 10 has a plurality of flexible legs 30, 32, 34, 36 and 38 integral therewith and projecting into the space 26 and angularly toward the base 20. These legs 30, 32, 34, 36 and 38 are extruded integrally with the carrier and extend continuously along the length of the carrier 12.

The carrier 12 also includes a sealing leg 42 and a wedging leg 44 which are extruded integrally with the wall 24 and project into the space 26 angularly toward the base 20.

Figure 2:
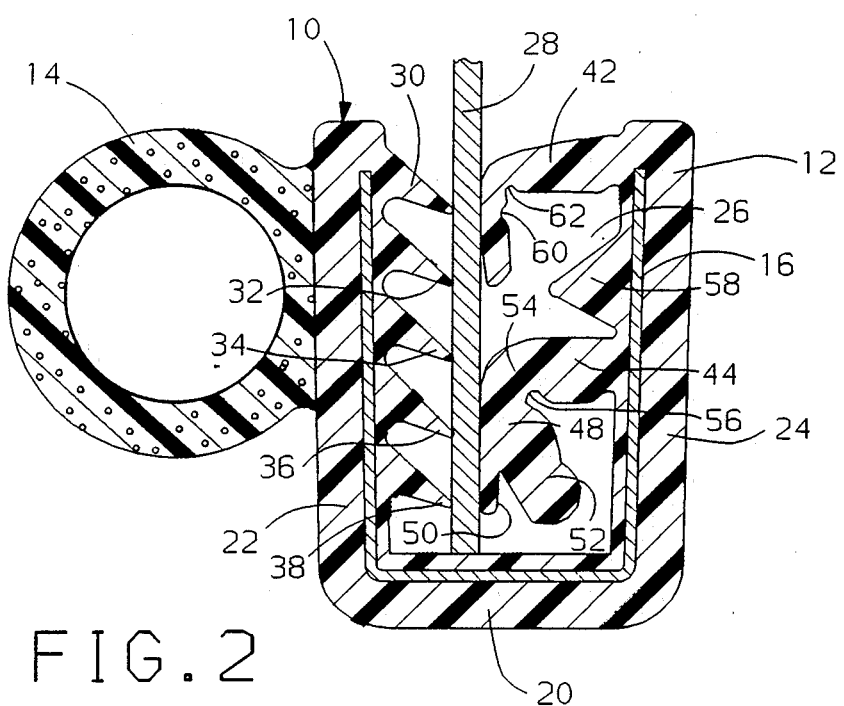
FIG. 2 is a section taken through the weatherstrip after it is installed on a vehicle body flange.

As seen in FIG. 2, installation of the carrier 12 over the flange 28 causes the sealing leg 42 and wedging leg 44 of the wall 24 to be biased further angularly toward the base 20. The legs 30-38 are shorter than the sealing leg 42 and wedging leg 44 and flex only slightly upon installation so that the legs 30 and 38 will consistently locate the carrier on the flange irrespective of variations in the thickness of metal of the flange 28.

The outermost leg 30 and the sealing leg 42 each function to engage the opposite faces of flange 28 and prevent the entry of the moisture or other foreign matter into the space 26.

As best seen in FIG. 2, the legs 30-38 engaging the one face of the flange 28 and the sealing flange 42 and wedging leg 44 engaging the opposite face serve to frictionally and mechanically retain the carrier 10 upon the flange 28.

Upon attempted removal of the carrier 12 from the flange 28, either by intentional action of a service repairman, or through inadvertence by use of the vehicle, the various legs cooperate to resist removal of the carrier 12 from the flange 28. In particular, it is seen that the wedging leg 44 includes a foot 48 comprised of a toe portion 50 and a heel portion 52. In addition, the wedging leg has a knee portion 54 located at about its mid-length.

Figure 3:
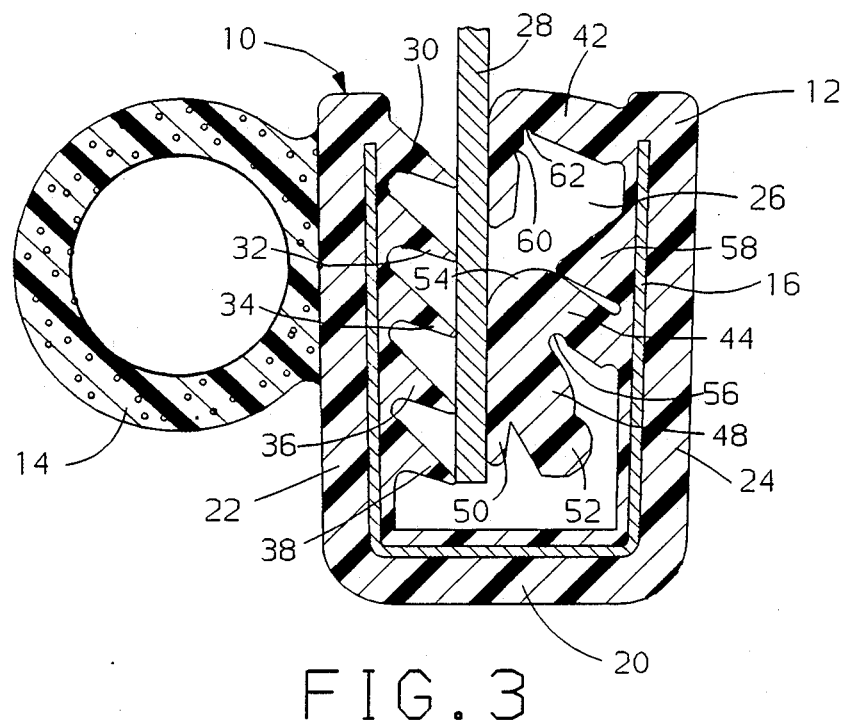
FIG. 3 is a section view showing the weatherstrip as it is beginning to be removed from the body flange.
Figure 4:
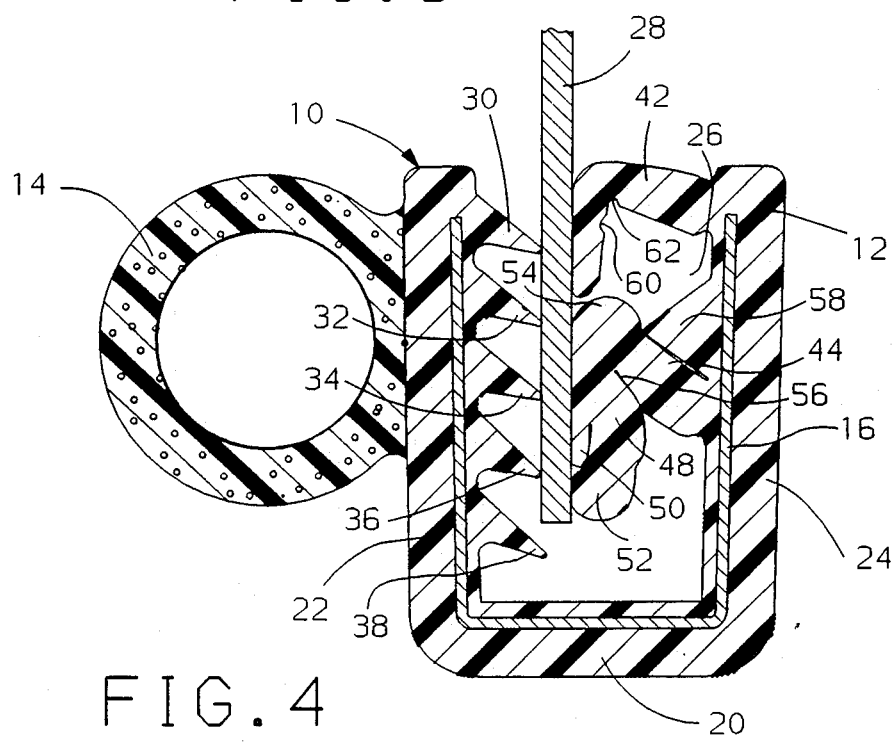
FIG. 4 is a section view showing further removal of the weatherstrip.

As seen in FIGS. 3 and 4, attempted removal of the carrier 12 from the flange 28 causes the frictional engagement between the toe 50 and the flange 28 to exert a generally columnar axial compressive load on the wedging leg 44 so that the wedging leg 44 begins to bow as facilitated and defined by the undercut 56 underlying the knee portion 54. During such bowing the foot 48 is rotated somewhat and carries the heel portion 52 into frictional engagement with the flange 28 so that both the toe portion 50 and the heel portion 52 are tending to resist the removal. As the removal progresses and the compressive load on the wedging leg 44 increases the bowing of the wedging leg 44 causes its knee portion 54 to move into engagement with a reaction arm 58 located above and adjacent to the knee portion 54. This engagement of the knee portion 54 with the reaction arm 58 effectively shortens the wedging and supports the shortened wedging leg 44 against further bowing by the compressive load applied thereagainst. Eventually the load applied to the carrier is sufficient to overcome the frictional contact between the foot 48 and the flange 28 so that the carrier 10 will be removed from the flange 28.

It will be understood that the heel portion 52 may have rotated into engagement with the flange either before, after, or during the engagement of the knee portion 54 with the reaction arm 58, depending on the dimensions of the carrier, thickness of the flange 28, composition of the elastomeric material, and other variables.

The sealing flange 42 is undercut at 60 and 62 so that it also maintains a substantial area of frictional contact with the flange during removal of the carrier from the flange 28 and also assists in increasing the removal of force required to remove the weatherstrip carrier.

Thus it is seen that the invention provides a new and improved weatherstrip carrier which provides increased resistance to inadvertent removal of the weatherstrip carrier from a vehicle body flange.

The embodiments of the invention in which an exclusive property or privilege is claimed are defined as follows:

1. A channel shaped weatherstrip carrier of elastomeric material having spaced apart walls connected by a base and contacting legs extending inwardly from the walls to engage with the opposed faces of a flange of a vehicle body installed between the walls to thereby retain the carrier on the vehicle, wherein the improvement comprises:

a wedging leg extending inwardly from at least one of the walls and angularly toward the base, said wedging leg having a foot frictionally engaging with the adjacent face of the flange, said wedging leg having a knee portion located about mid-length thereof between the at least one of the walls and the foot so that the attempted removal of the carrier from the flange places the wedging leg in a condition of axial compression and tends to bow the wedging leg about the knee portion;

and a reaction arm extending inwardly from the one wall adjacent to the wedging leg and being engageable by the wedging leg at the knee portion thereof upon bowing of the wedging leg so that the effective length of the wedging leg is shortened to minimize the bowing of the wedging leg and thereby maintain the wedging leg in generally columnar axial compression whereby the removal of the carrier from the vehicle flange is impeded.

2. A channel shaped weatherstrip carrier of elastomeric material having spaced apart walls connected by a base and contacting legs extending inwardly from the walls to engage with the opposed faces of a flange of a vehicle body installed between the walls to thereby retain the carrier on the vehicle, wherein the improvement comprises:

a wedging leg extending inwardly from at least one of the walls and angularly toward the base, said wedging leg having a foot including a toe portion frictionally engaging with the adjacent face of the flange whereby the attempted removal of the carrier from the flange is resisted by the frictional engagement of at least the foot toe portion with the flange and the wedging leg is placed in a condition of axial compression tending to bow the wedging leg as the carrier is removed from the flange;

said wedging leg having a relatively weakened knee joint generally at the mid length thereof and adapted to define and control the bowing of the wedging leg as the carrier is removed from the flange;

said foot of the wedging leg having a heel portion which is carried into progressive frictional engagement with the flange during progressive removal of the carrier from the flange, thereby increasing the area of frictional contact between the flange and the foot of the wedging leg so that the wedging leg progressively resists the removal of the carrier from the flange;

and a reaction arm extending inwardly from the one wall adjacent to the knee joint of the wedging leg and being engageable by the wedging leg upon bowing of the wedging leg so that the wedging leg supported at a point closer to the foot to minimize the bowing of the wedging leg and thereby maintain the wedging leg in generally columnar axial compression and maintain the foot of the wedging leg in substantial frictional engagement with the flange whereby the removal of carrier from the vehicle flange is substantially resisted.

* * * * *